(12) United States Patent
Malsot et al.

(10) Patent No.: US 11,598,230 B2
(45) Date of Patent: Mar. 7, 2023

(54) FLUID CIRCUIT AND A PROCESS FOR CONTROLLING A FLOW OF FLUID SUPPLIED TO AT LEAST ONE EQUIPMENT

(71) Applicant: VOLVO TRUCK CORPORATION, Gothenburg (SE)

(72) Inventors: Guillaume Malsot, Marennes (FR); Nicolas Granottier, Lyons (FR)

(73) Assignee: VOLVO TRUCK CORPORATION, Gothenburg (SE)

( * ) Notice: Subject to any disclaimer, the term of this patent is extended or adjusted under 35 U.S.C. 154(b) by 0 days.

(21) Appl. No.: 16/767,659

(22) PCT Filed: Dec. 29, 2017

(86) PCT No.: PCT/EP2017/084838
§ 371 (c)(1),
(2) Date: May 28, 2020

(87) PCT Pub. No.: WO2019/129367
PCT Pub. Date: Jul. 4, 2019

(65) Prior Publication Data
US 2020/0318506 A1 Oct. 8, 2020

(51) Int. Cl.
*F01M 1/16* (2006.01)
*F02M 37/00* (2006.01)
*F02M 37/08* (2006.01)

(52) U.S. Cl.
CPC .......... *F01M 1/16* (2013.01); *F02M 37/0052* (2013.01); *F02M 37/08* (2013.01);
(Continued)

(58) Field of Classification Search
CPC .......... F01M 1/16; F01M 5/005; F01M 5/007; F02M 37/0052; F02M 37/08;
(Continued)

(56) References Cited

U.S. PATENT DOCUMENTS 2,309,195 A * 1/1943 Jirsa ........................ F16N 13/20
  417/310
2,540,629 A * 2/1951 Miller .................... F01M 5/007
  165/280

(Continued)

FOREIGN PATENT DOCUMENTS

DE          2629730 A1   1/1978
DE    102006013867 A1   9/2007
(Continued)

OTHER PUBLICATIONS

European Office Action dated Mar. 23, 2022 in corresponding European Patent Application No. 17835687.9, 5 pages.
(Continued)

*Primary Examiner* — Sizo B Vilakazi
*Assistant Examiner* — Brian R Kirby
(74) *Attorney, Agent, or Firm* — Venable LLP; Jeffri A. Kaminski (57) ABSTRACT

The invention relates to a fluid circuit (3) comprising: —a supply line (5) for carrying a fluid from a pump (4) connected to a fluid tank (2) to an equipment (8), the supply line having a portion which is divided into a main line (10) including a heat exchanger (13), and a by-pass line (15) for by-passing said heat exchanger; —a first valve (31) for controlling the respective fluid flows in the main line (10) and in the by-pass line (15), and a first control device (33) for controlling the first valve (31) depending on a first parameter (T) of the fluid; —a pressure regulation circuit for carrying fluid from the supply line (5) towards the fluid tank (2), said pressure regulation circuit comprising a pressure regulation valve (23) for controlling the flow of fluid directed back to the fluid tank (2); wherein the pressure regulation circuit comprises: —a first recirculation line (21) branching from the supply line (5) downstream from the by-pass line outlet (17); —a second recirculation line (22)
(Continued)

branching from the supply line (5) upstream from the by-pass line inlet (16); —a second valve (32) for controlling the respective fluid flows in the first recirculation line (21) and in the second recirculation line (22), and a second control device (33) for controlling the first valve (31) depending on a second parameter (T) of the fluid.

20 Claims, 7 Drawing Sheets

(52) U.S. Cl.
    CPC ...... *F16N 2270/56* (2013.01); *F16N 2270/60* (2013.01); *F16N 2280/00* (2013.01)
(58) Field of Classification Search
    CPC ................ F02M 37/0047; F02M 31/16; F16N 2270/56; F16N 2270/60; F16N 2280/00; Y02T 10/12
    USPC ......... 123/196 R, 41.44, 541, 685, 686, 689, 123/196 AB
    See application file for complete search history.

(56) References Cited

U.S. PATENT DOCUMENTS

| | | | | |
|---|---|---|---|---|
| 2,706,886 A * | 4/1955 | Michel | ...................... | F02K 1/15 60/392 |
| 2,896,919 A * | 7/1959 | Teague, Jr. | ............... | F01P 11/08 236/34.5 |
| 3,090,365 A * | 5/1963 | Constantino | ........... | F01M 5/005 123/41.08 |
| 4,020,632 A | 5/1977 | Coffinberry et al. | | |
| 4,027,643 A * | 6/1977 | Feenan | .................. | F01M 5/007 123/196 AB |
| 4,270,562 A * | 6/1981 | Oberth | ...................... | F01P 9/00 123/41.35 |
| 4,276,960 A * | 7/1981 | Webb | ...................... | F16N 25/02 137/115.14 |
| 4,393,824 A * | 7/1983 | Fischer | .................... | B60H 1/22 123/196 R |
| 4,566,530 A * | 1/1986 | Gooden | ............. | G05D 23/1925 236/12.21 |
| 4,890,695 A * | 1/1990 | Morris | ................... | F01M 11/12 123/196 R |
| 5,067,454 A * | 11/1991 | Waddington | ............ | F16N 29/02 700/282 |
| 5,215,044 A * | 6/1993 | Banzhaf | .................. | F01P 7/165 123/41.31 |
| 5,215,065 A * | 6/1993 | Snyder | ................. | F02M 31/102 123/552 |
| 5,220,892 A * | 6/1993 | Boemer | ................. | F01M 5/002 123/196 AB |
| 5,339,776 A * | 8/1994 | Regueiro | ................. | F01M 1/16 123/196 AB |
| 5,483,928 A * | 1/1996 | Mahlberg | .................. | F01P 3/02 123/196 AB |
| 5,887,562 A * | 3/1999 | von Esebeck | ........... | F01M 1/12 123/196 R |
| 6,740,000 B2 * | 5/2004 | Wakayama | ......... | F16H 57/0434 475/161 |
| 6,871,703 B2 * | 3/2005 | Kemmerer | .............. | F16H 59/72 165/103 |
| 7,288,039 B2 * | 10/2007 | Foster | ..................... | F16H 61/12 475/5 |
| 9,181,849 B2 * | 11/2015 | Takemoto | ................ | F01M 1/08 |
| 2007/0049442 A1* | 3/2007 | Long | ..................... | B60K 6/445 475/5 |
| 2008/0051251 A1* | 2/2008 | Ogata | ................. | F16H 61/0021 477/52 |
| 2012/0006622 A1* | 1/2012 | Will | ...................... | F01M 5/001 184/6.22 |
| 2012/0048228 A1* | 3/2012 | Chung | ................... | F01M 5/005 123/196 R |
| 2012/0180878 A1* | 7/2012 | Greenwood | ....... | A01B 63/1006 137/488 |
| 2014/0169994 A1* | 6/2014 | Schuller | .............. | F16H 57/0435 417/410.1 |
| 2014/0373524 A1* | 12/2014 | Schuller | .............. | F16H 57/0473 60/429 |
| 2016/0061071 A1* | 3/2016 | Lee | ........................ | F01M 5/005 184/6.1 |
| 2017/0074131 A1* | 3/2017 | Ritter | ...................... | F01P 11/08 |
| 2017/0342877 A1* | 11/2017 | Harres | .................. | F01M 11/10 |
| 2019/0203827 A1* | 7/2019 | Shin | ..................... | F16H 61/0251 |
| 2020/0149562 A1* | 5/2020 | Haberstock | ......... | F16H 57/0435 |

FOREIGN PATENT DOCUMENTS

| | | | |
|---|---|---|---|
| JP | H05231119 A | * | 9/1993 |
| JP | H05231119 A | | 9/1993 |
| WO | 2017085355 A1 | | 5/2017 |

OTHER PUBLICATIONS

International Search Report and Written Opinion dated Sep. 5, 2018 in corresponding International PCT Application No. PCT/EP2017/084838, 10 pages.

* cited by examiner

FLUID CIRCUIT AND A PROCESS FOR CONTROLLING A FLOW OF FLUID SUPPLIED TO AT LEAST ONE EQUIPMENT

CROSS-REFERENCE TO RELATED APPLICATIONS

This application is a U.S. National Phase of PCT/EP2017/084838, filed Dec. 29, 2017, and published on Jul. 4, 2019, as WO 2019/129367 A1, all of which is hereby incorporated by reference in its entirety.

TECHNICAL FIELD

The invention relates to a fluid circuit, to a fluid system comprising such a fluid circuit, and to a vehicle comprising such a fluid system. The invention also relates to a process for controlling a flow of fluid supplied from a fluid tank to at least one equipment.

The invention can be applied in light, medium and heavy-duty vehicles, such as trucks, buses and construction equipment, and more generally in any vehicle equipped with a combustion engine, including boats and planes.

BACKGROUND

Fluid systems are used in a wide range of technical fields and applications. For example, vehicles conventionally comprise a fluid system for carrying oil to various equipments of the vehicle, for lubricating, cooling or moving said equipments.

Such a fluid system typically comprises a fluid tank, a pump, and a supply line for carrying the fluid to the equipment(s). The supply line generally includes a heat exchanger in order to control the temperature of the fluid provided to the equipment(s).

When the pump is a constant displacement pump, it provides the same flow at a given rotation speed, whereas the current required fluid pressure may be lower. This results in an unnecessarily high fuel consumption. To limit this drawback, without using more sophisticated and therefore more expensive pumps (such as recirculation pumps or variable capacity pumps), part of the fluid provided by the pump can be directed back to the fluid tank instead of being supplied to the equipment. To that end, part of the fluid exiting the heat exchanger is directed back to the fluid tank, and this fluid return flow can be controlled by the fluid pressure.

However, the known fluid systems are not fully satisfactory, as they still bring significant pressure losses and therefore energy waste.

SUMMARY

An object of the invention is to provide a fluid circuit and a process for controlling a flow of fluid supplied by such a fluid circuit, which improves the known solutions, in particular in terms of energy consumption.

To that end, according to a first aspect, the invention relates to a fluid circuit comprising:
 a supply line for carrying a fluid from a pump connected to a fluid tank to at least one equipment, the supply line having a portion which is divided into a main line including a heat exchanger, and a by-pass line for by-passing said heat exchanger, the main line and the by-pass line being arranged in parallel and both having an inlet and an outlet;

2 a first valve for controlling the respective fluid flows in the main line and in the by-pass line, and a first control device for controlling the first valve depending on a first parameter of the fluid;
 a pressure regulation circuit for carrying fluid from the supply line towards the fluid tank, said pressure regulation circuit comprising a pressure regulation valve for controlling the flow of fluid directed back to the fluid tank;
wherein the pressure regulation circuit comprises:
 a first recirculation line branching from the supply line downstream from the by-pass line outlet, for carrying fluid from the supply line towards the fluid tank;
 a second recirculation line branching from the supply line upstream from the by-pass line inlet, for carrying fluid from the supply line towards the fluid tank;
 a second valve for controlling the respective fluid flows in the first recirculation line and in the second recirculation line, and a second control device for controlling the second valve depending on a second parameter of the fluid.

Thus, the invention makes it possible, in some operational conditions corresponding to the pressure and to the second parameter of the fluid, to deviate the fluid—to direct it back to the fluid tank—before it enters the heat exchanger. This allows a significant reduction of pressure losses, i.e. of absorbed torque on the pump shaft, and ultimately a decrease in energy consumption.

In other words, when the pump capacity is higher than the current needs, and when it is determined that the whole fluid flow provided by the pump is not required to pass through the heat exchanger to reach the appropriate operating conditions, at least part of said fluid is prevented to enter the heat exchanger, which is a high pressure drop component.

Another advantage of the invention is that it allows implementing heat exchangers having smaller capacities, thus reducing the overall fluid circuit cost. This further improves overall efficiency, as a heat exchanger efficiency is better when the fluid flow passing through it is higher. In the fluid circuit of the invention, the heat exchanger can be a fluid cooler.

Owing to the invention, the temperature and pressure management of the fluid circuit is greatly improved, as the fluid provided to the equipment has a flow rate fulfilling but not exceeding the current equipment needs, and a temperature just below the highest acceptable temperature.

The first and second parameters of the fluid can be a measured or calculated parameter at a given point of the fluid circuit, or in the fluid tank, for example.

At least one of the first and second parameters of the fluid can be a fluid temperature. Therefore, in an embodiment in which the heat exchanger is a cooler:
 if the fluid temperature is above a predetermined value, then the fluid has to pass through the heat exchanger, and if it is determined that some fluid has to be directed to the fluid tank before entering the equipment(s), said fluid is carried through the first recirculation line, i.e. downstream from the heat exchanger;
 if the fluid temperature is below a predetermined value, then the fluid is not required to pass through the heat exchanger, and if it is determined that some fluid has to be directed to the fluid tank before entering the equipment(s), said fluid is carried through the second recirculation line, i.e. upstream from the heat exchanger. Thus, the fluid returning to the fluid tank does not flow through the heat exchanger—which is not needed given its temperature—so pressure drop is reduced.

In an embodiment, at least one of the first and second parameters of the fluid is the fluid temperature in the supply line, preferably downstream from the by-pas line outlet (i.e. at the equipment inlet). Alternatively, said parameter(s) can be the fluid temperature at another location of the fluid circuit, for example: at the heat exchanger outlet, upstream from the by-pass line outlet; or upstream from the by-pass line inlet.

The first and second parameters can be one and the same.

As regards the first and second control devices, they can be configured to synchronise the displacements of the first valve and of the second valve. The first and second control devices can be one and the same.

By "synchronise" is meant that the actuation of the first valve and the actuation of the second valve are implemented to achieve corresponding and appropriate full or partial openings/closings of the main line and by-pass line, on the one hand, and or the first recirculation line and second recirculation line, on the other hand, to control the respective fluid flows and provide an efficient pressure and temperature regulation in the fluid circuit.

In an embodiment, the first valve and the second valve comprise one and the same body which forms the movable member of one and the same valve device.

In other words, according to this embodiment, the invention relates to a fluid circuit comprising:
- a supply line for carrying a fluid from a pump connected to a fluid tank to at least one equipment, the supply line having a portion which is divided into a main line including a heat exchanger, and a by-pass line for by-passing said heat exchanger, the main line and the by-pass line being arranged in parallel and both having an inlet and an outlet;
- a first recirculation line branching from the supply line downstream from the by-pass line outlet, for carrying fluid from the supply line towards the fluid tank;
- a second recirculation line branching from the supply line upstream from the by-pass line inlet, for carrying fluid from the supply line towards the fluid tank;
- a valve device comprising one movable member the displacement of which is controlled by a control device depending on a parameter of the fluid, such as a fluid temperature, the movable member forming both a first valve for controlling the respective fluid flows in the main line and in the by-pass line and a second valve for controlling the respective fluid flows in the first recirculation line and in the second recirculation line;
- a pressure regulation valve for controlling the flow of fluid directed back to the fluid tank through the first and/or second recirculation lines.

In concrete terms, the invention can provide a single thermostat valve the actuation of which allows controlling the fluid flow both through the heat exchanger and through the pressure regulation circuit. With the actuation of a single thermostat valve, the invention makes it possible to control the fluid flow both through the heat exchanger and through the pressure regulation circuit.

Alternatively, the first valve and the second valve could be separate members, provided their respective movements are synchronised, to allow adequately regulating both the fluid pressure and temperature.

The control devices can comprise wax elements, which are sensitive to the fluid temperature, or electrical components (solenoid valve, electric motor, etc.), which are controlled by a control unit.

The first valve may be arranged upstream from the heat exchanger, or downstream from the heat exchanger.

The first valve can be a three-way valve. Typically, this three-way valve can be arranged at the by-pass line inlet, and can comprise: an inlet in communication with the portion of the supply line connected to the pump outlet, a first outlet opening towards the heat exchanger, and a second outlet opening towards the by-pass line.

Alternatively, the first valve can be a two-way valve arranged in the by-pass line. With such an arrangement, the first valve does not directly control the fluid flow in the main line. It rather controls the fluid flow in the by-pass line and, as a consequence, the fluid flow in the main line, through heat exchanger.

The pressure regulation valve can include a first passageway for the first recirculation line and a second passageway for the second recirculation line, the pressure regulation valve being movable between a closed position, in which both the first and the second passageways are closed, and an open position, in which both the first and the second passageways are open.

The pressure regulation valve displacement can be controlled depending on the fluid pressure in the fluid circuit, for example in the supply line, preferably downstream from the by-pass line outlet (i.e. at the equipment inlet).

According to a second aspect, the invention relates to a fluid system comprising a fluid circuit as previously described, and further comprising a fluid tank and a constant displacement pump arranged between the fluid tank and a supply line inlet.

According to a third aspect, the invention relates to a vehicle, especially an industrial vehicle such as a truck, a bus, or a construction vehicle, comprising a fluid system as previously described and an engine, wherein the fluid is oil, the vehicle further comprising at least one equipment such as a vehicle equipment to be lubricated by the fluid, a vehicle equipment to be cooled by the fluid or a vehicle equipment to be moved by the fluid. The heat exchanger can typically be an oil cooler.

According to a fourth aspect, the invention relates to a process for controlling a flow of fluid supplied from a fluid tank to at least one equipment, by means of a constant displacement pump and a supply line, the supply line having a portion which is divided into a main line including a heat exchanger, and a by-pass line for by-passing said heat exchanger, the main line and the by-pass line being arranged in parallel and both having an inlet and an outlet, wherein the method comprises:
- monitoring a first parameter of the fluid and controlling the respective fluid flows in the main line and in the by-pass line according to said first parameter;
- monitoring a second parameter of the fluid;
- controlling a fluid return flow directed from the supply line back to the fluid tank depending on a fluid pressure, and controlling the respective fluid flows carried back from the supply line (i) from an area located downstream from the by-pass line outlet and (ii) from an area located upstream from the by-pass line inlet, according to said second parameter.

In an embodiment, at least one of the first and second parameters of the fluid is a fluid temperature, preferably in the supply line or in the fluid tank. Advantageously, the first and second parameters may be one and the same.

The step of controlling the respective fluid flows in the main line and in the by-pass line according to said first parameter, and the step of controlling the respective fluid flows carried back from the supply line (i) from an area located downstream from the by-pass line outlet and (ii) from an area located upstream from the by-pass line inlet, according to said second parameter, can be synchronously carried out. For example, this can be achieved by means of one and the same movable member, controlled by a single control device according to one and the same parameter.

In case the second parameter is a fluid temperature, preferably in the supply line or in the fluid tank, and the heat exchanger is a cooler, when it is determined, because of the fluid pressure, that part of the fluid has to be carried back to the fluid tank, the process can imply that:
when said fluid temperature is below a first predetermined threshold, the fluid directed back to the fluid tank is carried from the supply line only from an area located upstream from the by-pass line inlet;
and/or, when said fluid temperature is above a second predetermined threshold, the fluid directed back to the fluid tank is carried from the supply line only from an area located downstream from the by-pass line outlet.

The second threshold is preferably higher than the first threshold.

When the fluid temperature is between the first and second thresholds, part of the fluid directed back to the fluid tank can be carried from the supply line from an area located downstream from the by-pass line outlet, and from an area located upstream from the by-pass line inlet.

Further advantages and advantageous features of the invention are disclosed in the following description and in the dependent claims.

BRIEF DESCRIPTION OF THE DRAWINGS

With reference to the appended drawings, below follows a more detailed description of embodiments of the invention cited as examples.

In the drawings:

FIGS. 3a and 3b; FIGS. 4a and 4b; FIGS. 5a and 5b.

DETAILED DESCRIPTION OF EXAMPLE EMBODIMENTS OF THE INVENTION

Figure 1:
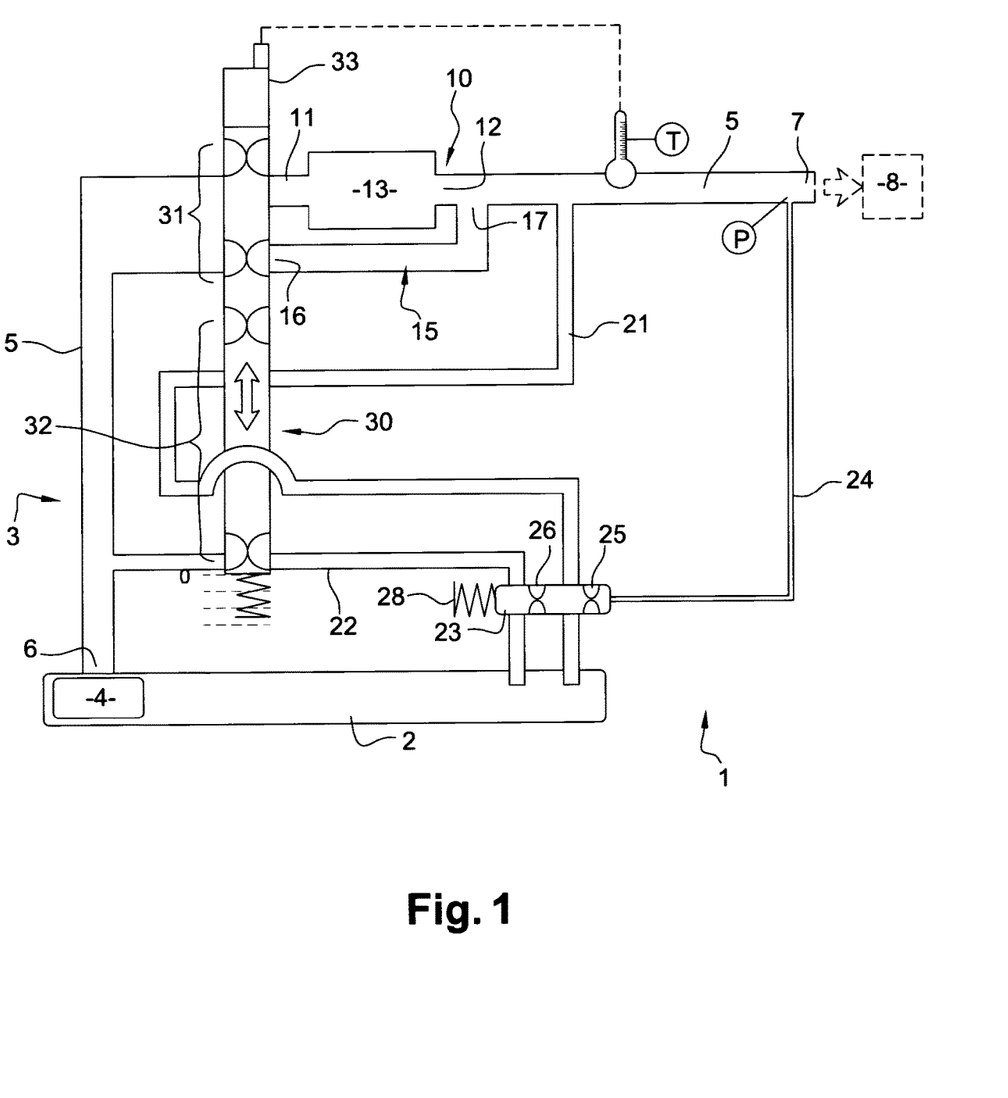
FIG. 1 is a schematic view of a fluid system according to an embodiment of the invention.

FIG. 1 schematically shows a fluid system 1 according to an embodiment of the invention, which comprises a fluid tank 2, a fluid circuit 3 and a pump 4, preferably a constant displacement pump.

The fluid circuit 3 comprises a supply line 5 having an inlet 6 and an outlet 7, the pump 4 being arranged between the fluid tank 2 and the supply line inlet 6. The supply line 5 allows carrying the fluid from the fluid tank 2 to at least one equipment 8.

The fluid system 1 can be part of a vehicle (not shown), especially an industrial vehicle such as a truck, a bus, or a construction vehicle. In such an application, the fluid can be oil, and can be used to lubricate, cool or move one equipment 8 of the vehicle.

A portion of the supply line 5 is divided into two lines arranged in parallel, namely:
a main line 10, having an inlet 11 and an outlet 12, said main line 10 including a heat exchanger 13, for example consisting in an oil cooler;
and a by-pass line 15, having an inlet 16 and an outlet 17, said by-pass line 15 allowing by-passing the heat exchanger 13.

The fluid circuit 3 further comprises a first recirculation line 21 branching from the supply line 5 downstream from the by-pass line outlet 17, and a second recirculation line 22 branching from the supply line 5 upstream from the by-pass line inlet 16. Both recirculation lines 21, 22 allow directing part of the fluid from the supply line 5 back to the fluid tank 2 before it enters the equipment(s) 8, when appropriate.

In practice, the fluid circuit 3 includes a pressure regulation valve 23 for regulating the fluid pressure in the fluid circuit 3, i.e. for allowing at least part of the fluid to return to the fluid tank 2. The pressure regulation valve 23 is controlled according to the fluid pressure P in a point of the fluid circuit 3, for example a point located in the supply line 5, downstream from the by-pass line outlet 17. The pressure regulation valve 23 receives the fluid pressure P information through a pipe 24.

The pressure regulation valve 23 includes a first passageway 25 for the first recirculation line 21 and a second passageway 26 for the second recirculation line 22. The pressure regulation valve 23 is movable between a closed position, in which both the first and the second passageways 25, 26 are closed (see FIGS. 1 and 2a for instance), and an open position, in which both the first and the second passageways 25, 26 are open (see FIG. 2b for instance).

According to a general definition of the invention, the fluid circuit 3 further comprises:
a first valve 31 for controlling the respective fluid flows in the main line 10 and in the by-pass line 15, and a first control device for controlling the first valve depending on a first parameter of the fluid;
a second valve 32 for controlling the respective fluid flows in the first recirculation line 21 and in the second recirculation line 22, and a second control device for controlling the second valve 32 depending on a second parameter of the fluid.

In the non-limiting illustrated embodiment, there is provided a valve device 30 including a movable member a first portion of which forms the first valve 31, and a second portion of which forms the second valve 32. In other words, the first valve 31 and the second valve 32 comprise one and the same body which forms the movable member of one and the same valve device 30. The valve device 30 is controlled by one and the same control device 33, as the first and second control devices, said control device 33 being actuated depending on one and the same parameter, as the first and second parameters.

Said parameter can be a fluid temperature T. In the illustrated embodiment, the fluid temperature T is measured at a point located in the supply line 5, downstream from the by-pas line outlet 17. However, the fluid temperature T could be measured in another area of the supply line 5, in the fluid tank 2, etc., provided it allows efficiently controlling the valve device 30.

The control device 33 can be of any suitable type. It can comprise wax elements or electrical components.

With the above described implementation, the first valve 31 and the second valve 32 are moved simultaneously. In other words, the valve device 30 is used both to open or close the by-pass line 15, and to switch between the recirculation from an area of the supply line 5 located upstream from the heat exchanger 13 to the recirculation from an area of the supply line 5 located downstream from the heat exchanger 13.

According to the embodiment shown in FIGS. 1 to 6b, the first valve 31 of the valve device 30 can be a three-way valve, for example arranged upstream from the heat exchanger 13, while the second valve 32 can be a four-way valve, for example arranged both in the first recirculation line 21 and in the second recirculation line 22.

Figure 5A:
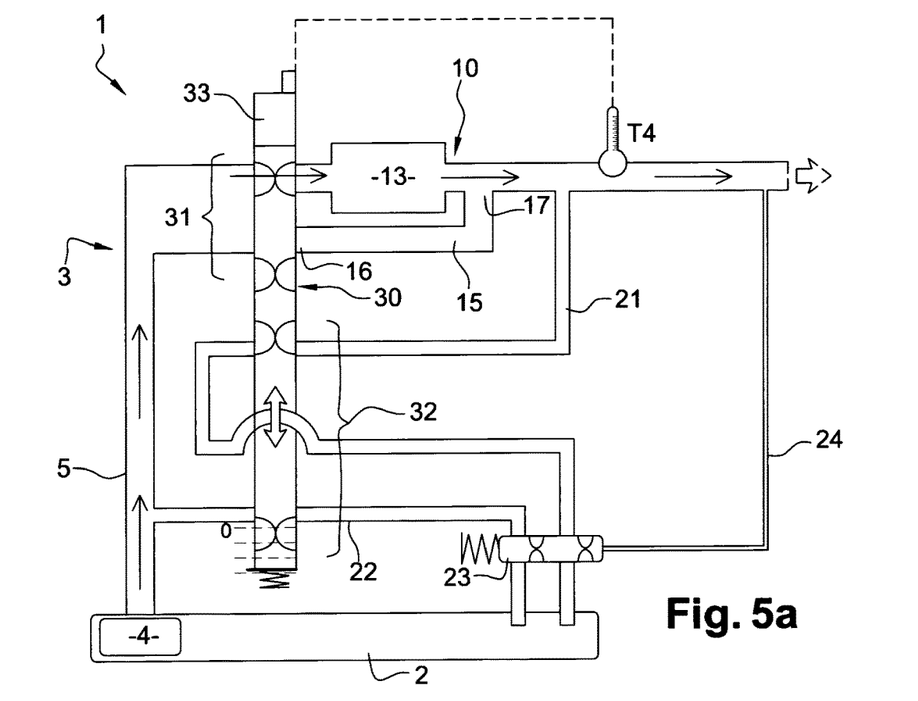
Figure 5B:
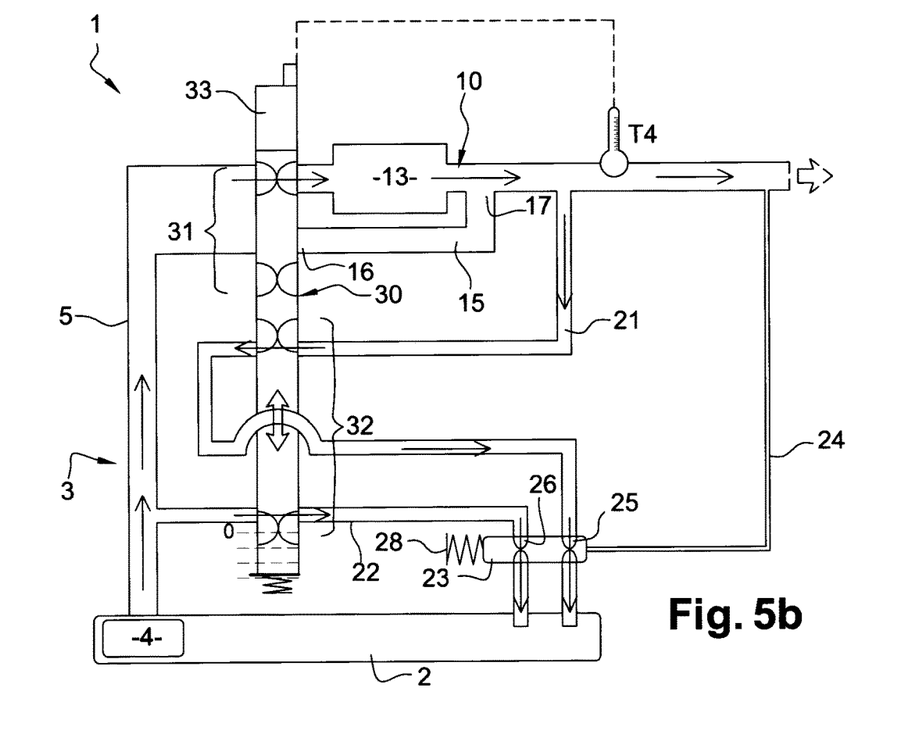
Figure 6A:
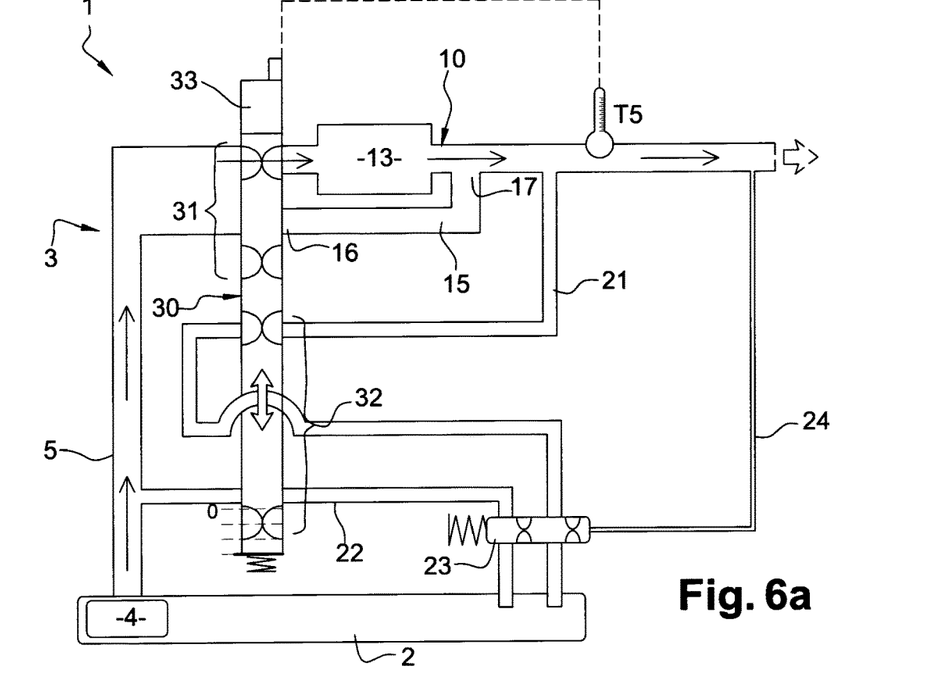
FIGS. 6a and 6b are similar to FIG. 2a, respectively 2b, in various other operating conditions.
Figure 6B:
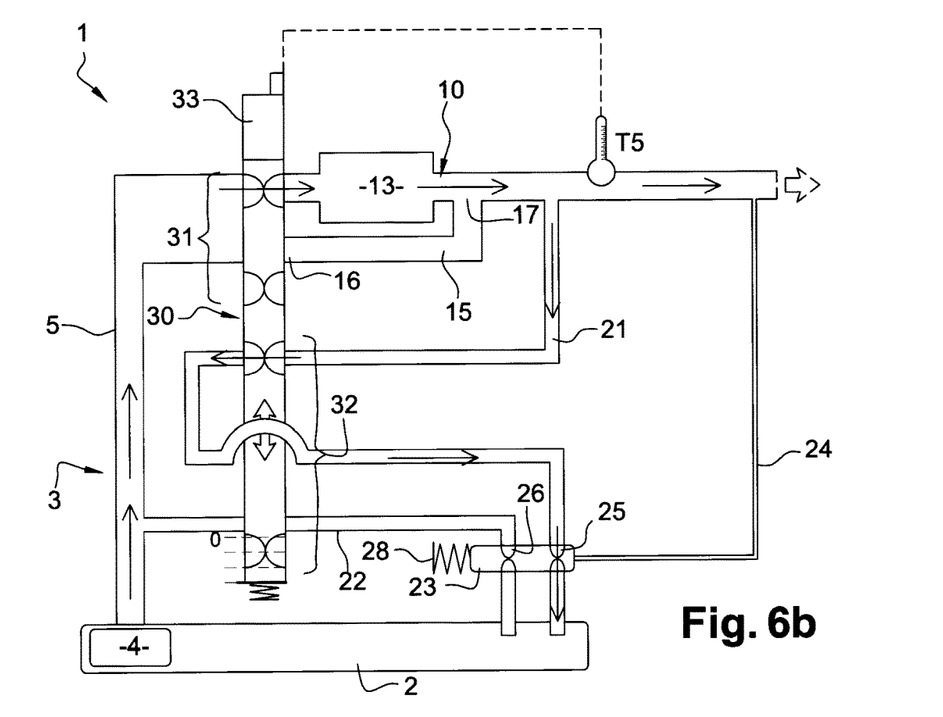

The operation of the fluid system 1 will now be described with reference to FIGS. 2a to 6b. The fluid system is illustrated when the measured fluid temperature is T=T1 (FIGS. 2a and 2b) and progressively increases to T2 (FIGS. 3a and 3b), T3 (FIGS. 4a and 4b), T4 (FIGS. 5a and 5b) and T5 (FIGS. 6a and 6b). In figures bearing the letter "a", no fluid recirculation is provided, whereas in figures bearing the letter "b", the pressure regulation is active, meaning that part of the fluid is directed back to the fluid tank 2 before it enters the equipment(s) 8. In practice, the pressure regulation valve 23 is open when pressure P in the pipe 24 is above the pressure regulation valve setting, which depends on the load of a biasing member 28 connected to the pressure regulation valve 23. As the fluid temperature T increases, the valve device 30 is moved further in the same direction, causing changes in the fluid flows, as explained below.

Figure 2A:
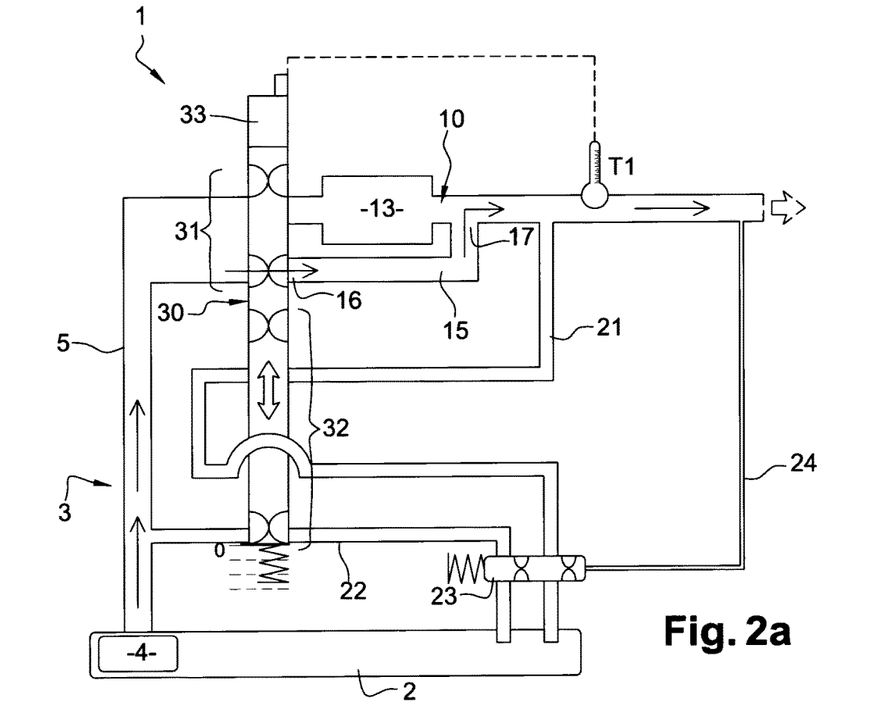
FIG. 2a shows the fluid system in one operating condition, when no fluid is directed back to the fluid tank.
Figure 2B:
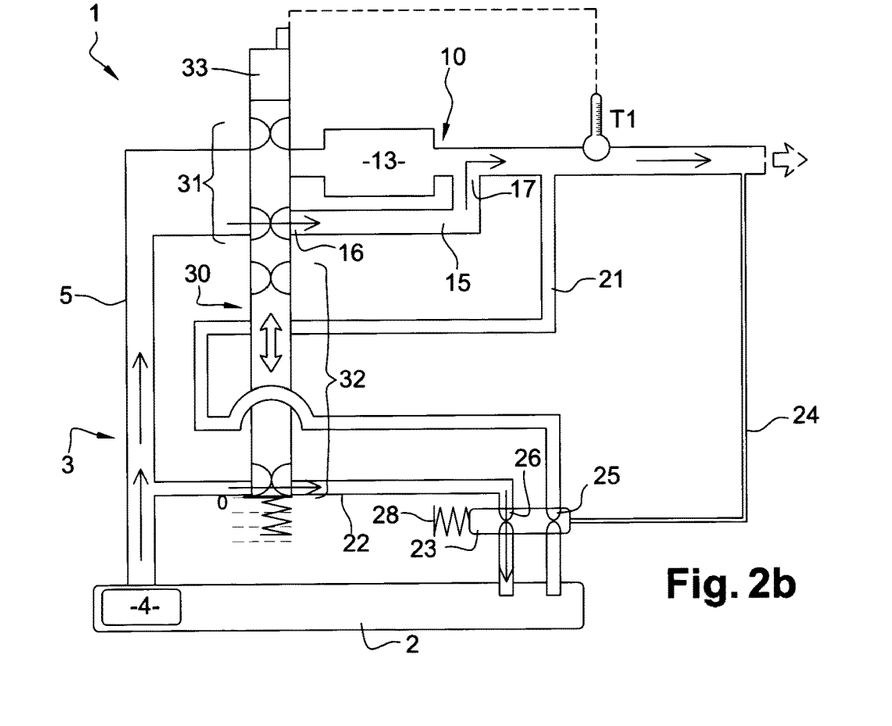
FIG. 2b shows the fluid system in the same operating condition, when some fluid is directed back to the fluid tank.
Figure 3A:
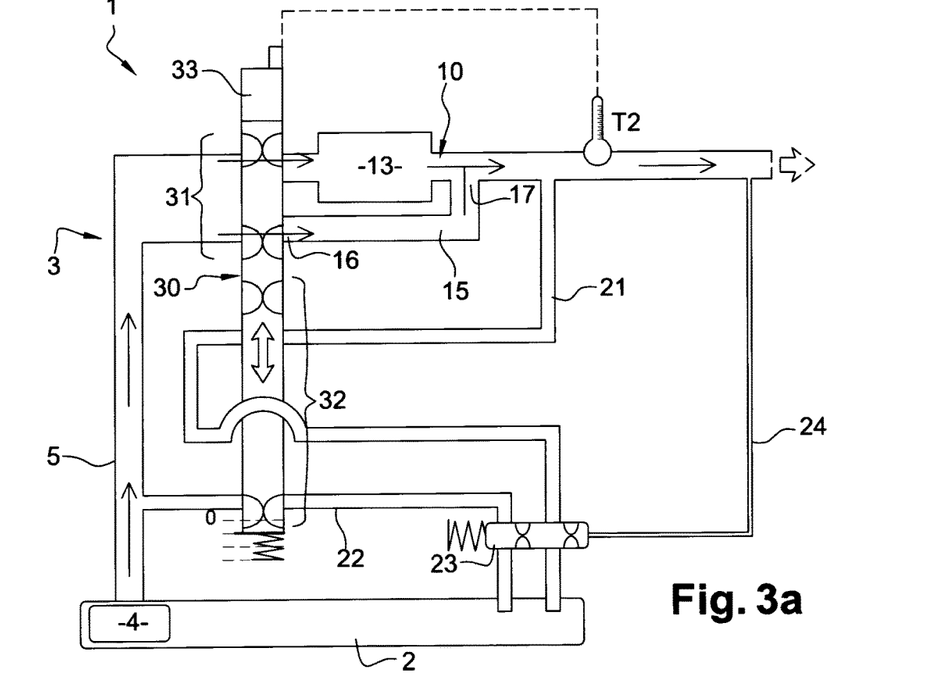
Figure 3B:
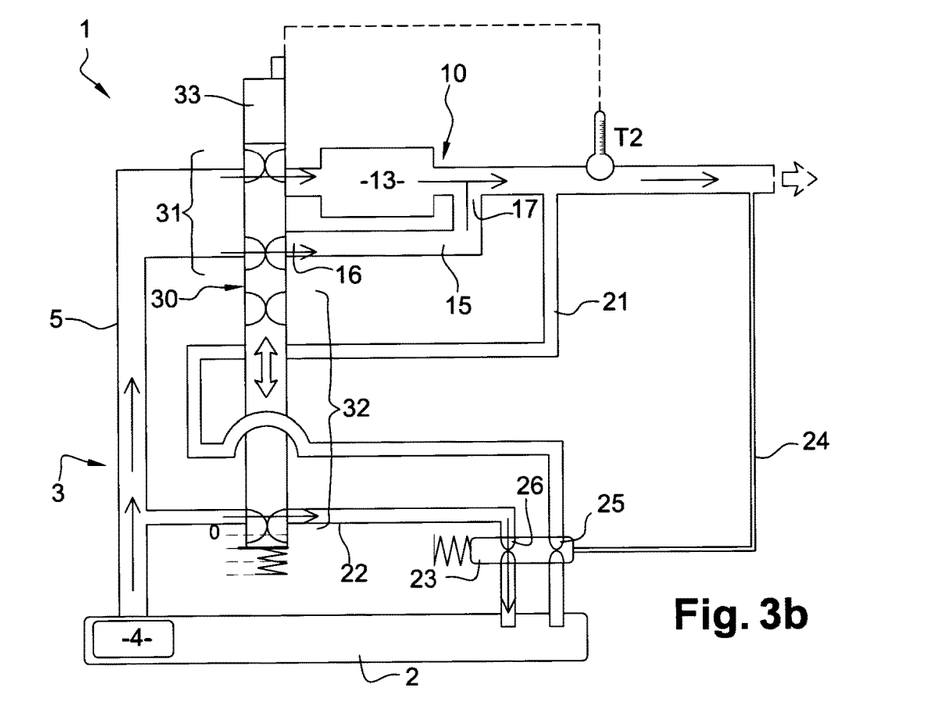
Figure 4A:
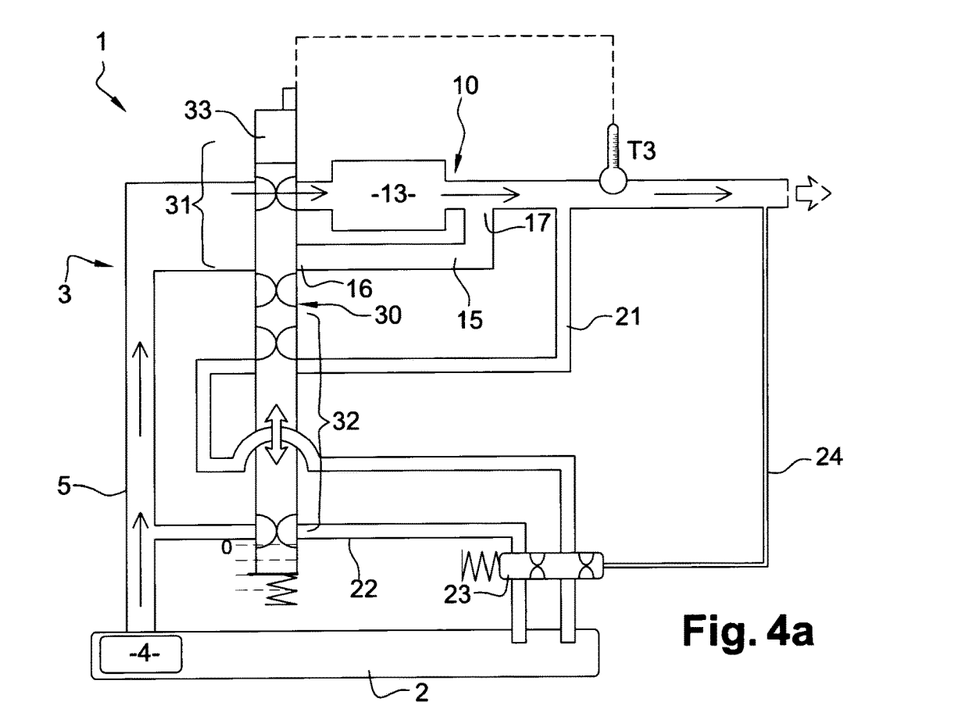
Figure 4B:
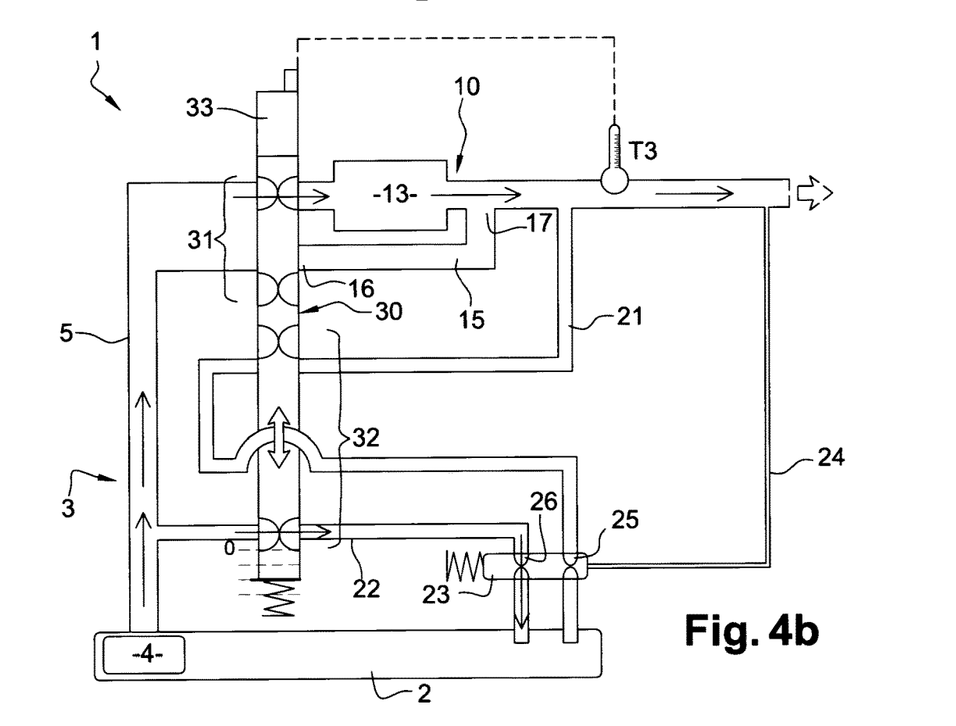

FIGS. 2a and 2b show the fluid system 1 when the fluid temperature T is T1, which is fairly low. In practice, this occurs from the lowest acceptable temperature for the system (around −40° C.) to T2, which may be around 115° C. for example. It has to be noted that these values are given only as examples that should not be considered as limitative. Moreover, these values may vary by some degrees if the temperature is measured in another location of the fluid system.

When T=T1, there is no need to cool the fluid provided to the equipment 8. Therefore, the valve device 30 is positioned such that no fluid flows through the heat exchanger 13, all the fluid passing through the by-pass line 15.

With this position, the valve device 30 causes the second recirculation line 22 to be open, and the first recirculation line 21 to be closed. Thus, when pressure regulation is needed (FIG. 2b), the pressure regulation valve 23 at least partially opens, so that some fluid is redirected to the fluid tank 2. In this case, the redirected fluid is carried from the supply line 5 only through the second recirculation line 22, i.e. from an area of the supply line 5 located upstream from the by-pass line inlet 16 (i.e. upstream from the heat exchanger 13). This does not impair the system operation, as the fluid is cool enough for not requiring it to pass through the heat exchanger 13. On the contrary, redirecting the fluid from upstream the heat exchanger prevents it from unnecessarily passing through the heat exchanger and, consequently, significantly reduces pressure losses.

When T reaches T2>T1 (FIGS. 3a and 3b), the fluid requires some cooling. Therefore, the valve device 30, actuated by the control device 33, begins to move to partially open the passageway of the supply line 5 towards the main line 10 and the heat exchanger 13, by means of the first valve 31.

The fluid circuit 3 and valve device 30 are configured such that this movement of the valve device 30 does not cause the second valve 32 to fully close the second recirculation line 22 nor to open the first recirculation line 21. Therefore, when pressure regulation is activated (FIG. 3b), the fluid returning to the fluid tank 2 is only carried by the second recirculation line 22.

When T reaches T3>T2 (FIGS. 4a and 4b), the fluid temperature is so high that all the fluid provided to the equipment 8 has to pass through the heat exchanger 13. For example, T3 can be around 117° C. Then, the control device 33 further moves the valve device 30, so that the first valve 31 fully closes the passageway towards the by-pass line 15.

Again, the fluid circuit 3 and valve device 30 are configured such that this movement of the valve device 30 does not cause the second valve 32 to fully close the second recirculation line 22 nor to open the first recirculation line 21. Therefore, when pressure regulation is activated (FIG. 4b), the fluid returning to the fluid tank 2 is only carried by the second recirculation line 22.

When T reaches T4>T3 (FIGS. 5a and 5b), the valve device 30 is further moved by the control device 33. For example T4 can be around 118° C.

On the one hand, this movement of the valve device 30 does not change the fluid flow provided to the equipment 8 by the supply line 5, as all the fluid still passes through the heat exchanger 13 to be cooled.

On the other hand, this results in the second valve 32 partly closing the second recirculation line 22 and partly opening the first recirculation line 21, as shown in FIG. 5b. Indeed, as the fluid temperature is fairly high, recirculating fluid only through the second recirculation line 22 would result in less fluid flowing through the heat exchanger 13, and therefore an insufficient cooling of the fluid. However, the fluid temperature is still low enough to allow some of the fluid returning to the fluid tank 2 to be carried by the second recirculation line 22, as another part of the fluid returning to the fluid tank 2 is carried by the first recirculation line 21, i.e. has been cooled in the heat exchanger 13.

Finally, when T reaches T5>T4 (FIGS. 6a and 6b), the fluid temperature is nearly at the highest acceptable value. For example, T5 can be around 119-120° C. The whole fluid flow provided to the equipment 8 has to pass through the heat exchanger 13. The valve device 30 is configured so that its further movement from the previous position (illustrated in FIGS. 5a and 5b) has left the passageway towards the heat exchanger 13 open.

The valve device 30 aforesaid movement further causes the second valve 32 to fully close the second recirculation line 22 and open the first recirculation line 21. Then, when pressure regulation is activated (FIG. 6b), the redirected fluid is carried from the supply line 5 to the fluid tank 2 only through the first recirculation line 21, i.e. from an area of the supply line 5 located downstream from the by-pass line outlet 17 (i.e. downstream from the heat exchanger 13). Indeed, in these operating conditions, the second recirculation line 22 cannot be used as it would not ensure enough cooling of the fluid, and could ultimately damage the equipment 8. Here, the reduction of pressure losses is a secondary objective that cannot be taken into account, as the priority objective is the fluid cooling.

Figure 7:
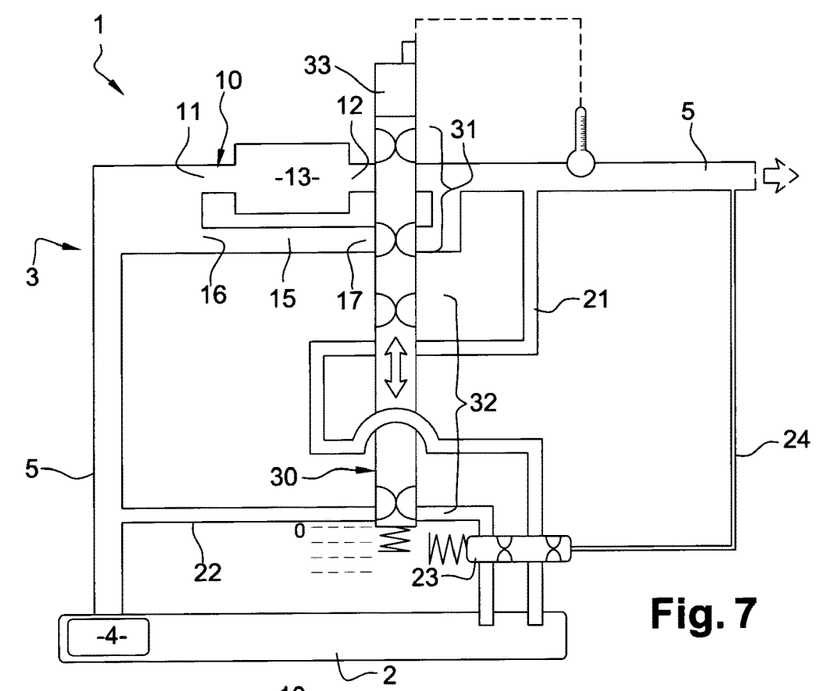
FIG. 7 is a schematic view of a fluid system according to another embodiment of the invention.

Turning now to FIG. 7, in another embodiment, the first valve 31 of the valve device 30 can be a three-way valve, for example arranged downstream from the heat exchanger 13, while the second valve 32 can be a four-way valve, for example arranged both in the first recirculation line 21 and in the second recirculation line 22.

Figure 8:
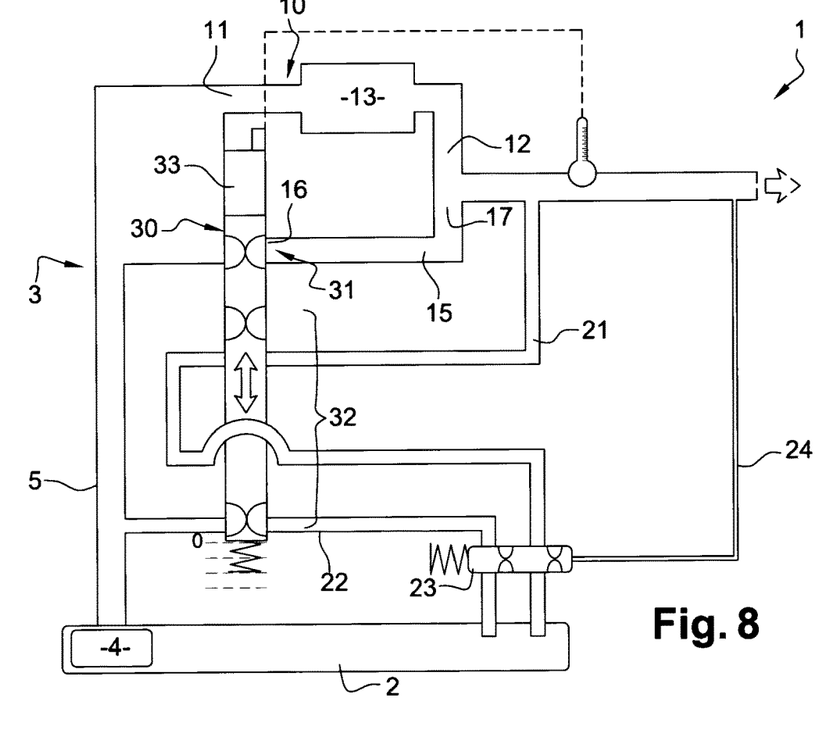
FIG. 8 is a schematic view of a fluid system according to yet another embodiment of the invention.

In still another embodiment illustrated in FIG. 8, the first valve 31 can be a two-way valve arranged in the by-pass line 15. More specifically, this two-way valve comprises an inlet in communication with the portion of the supply line 5 connected to the pump outlet, and an outlet which opens towards the by-pass line 15. With this implementation, the first valve 31 controls the fluid flow in the by-pass line 15, and thus indirectly controls the fluid flow in the main line 10.

In an alternative embodiment not shown, the two-way valve of FIG. 8 is arranged downstream from the heat exchanger 13.

It is to be understood that the present invention is not limited to the embodiments described above and illustrated in the drawings; rather, the skilled person will recognize that many changes and modifications may be made within the scope of the appended claims.

The invention claimed is:

1. A fluid system comprising:
a fluid tank;
a pump connected to the fluid tank;
a fluid circuit comprising: a supply line for carrying a fluid from the pump to at least one equipment, the supply line having an inlet and an outlet and further having a portion which is divided into a main line including a heat exchanger, and a by-pass line for by-passing said heat exchanger, the main line and the by-pass line being arranged in parallel and both having an inlet and an outlet; wherein the pump is arranged between the fluid tank and the supply line inlet, and wherein said portion of the supply line is located between the pump and the equipment; a first valve for controlling the respective fluid flows in the main line and in the by-pass line, and a first valve control device for controlling the first valve depending on a first parameter of the fluid; a pressure regulation circuit for carrying fluid from the supply line towards the fluid tank, said pressure regulation circuit comprising a pressure regulation valve for controlling the flow of fluid directed back to the fluid tank;
wherein the pressure regulation circuit comprises: a first recirculation line branching from the supply line downstream from the by-pass line outlet, for carrying fluid from the supply line towards the fluid tank; a second recirculation line branching from the supply line upstream from the by-pass line inlet, for carrying fluid from the supply line towards the fluid tank; both recirculation lines allowing directing part of the fluid from the supply line back to the fluid tank before it enters the equipment; a second valve for controlling the respective fluid flows in the first recirculation line and in the second recirculation line, and a second valve control device for controlling the second valve depending on a second parameter of the fluid.

2. The fluid system according to claim 1, wherein at least one of the first and second parameters of the fluid is a fluid temperature.

3. The fluid system according to claim 1, wherein at least one of the first and second parameters of the fluid is the fluid temperature in the supply line, preferably downstream from the by-pass line outlet.

4. The fluid system according to claim 1, wherein the first and second parameters are the same.

5. The fluid system according claim 1, wherein the first and second control devices are configured to synchronise the displacements of the first valve and of the second valve.

6. The fluid system according to claim 4, wherein the first and second valve control devices are implemented by a same control device.

7. The fluid system according to claim 6, wherein the fluid circuit comprises a valve device comprising a movable member, a first portion of the movable member forms the first valve and a second portion of the movable member forms the second valve.

8. The fluid system according to claim 1, wherein the first valve is arranged upstream from the heat exchanger.

9. The fluid system according to claim 1, wherein the first valve is arranged downstream from the heat exchanger.

10. The fluid system according to claim 1, wherein the first valve is a three-way valve.

11. The fluid system according to claim 1, wherein the first valve is a two-way valve arranged in the by-pass line.

12. The fluid system according to claim 1, wherein the pressure regulation valve includes a first passageway for the first recirculation line and a second passageway for the second recirculation line, the pressure regulation valve being movable between a closed position, in which both the first and the second passageways are closed, and an open position, in which both the first and the second passageways are open.

13. A fluid system comprising a fluid circuit according to claim 1, wherein the pump is a constant displacement pump.

14. A vehicle comprising a fluid system according to claim 1 and an engine, wherein the fluid is oil, the vehicle further comprising at least one equipment such as a vehicle equipment to be lubricated by the fluid, a vehicle equipment to be cooled by the fluid or a vehicle equipment to be moved by the fluid.

15. A process for controlling a flow of fluid supplied from a fluid tank to at least one equipment, by means of a constant displacement pump and a supply line, the supply line having an inlet and an outlet and having a portion which is divided into a main line including a heat exchanger, and a by-pass line for by-passing said heat exchanger, the main line and the by-pass line being arranged in parallel and both having an inlet and an outlet, wherein the pump is arranged between the fluid tank and the supply line inlet, and wherein said portion of the supply line is located between the pump and the equipment;
wherein the method comprises:
monitoring a first parameter of the fluid and controlling the respective fluid flows in the main line and in the by-pass line according to said first parameter;
monitoring a second parameter of the fluid;
controlling a fluid return flow directed from the supply line back to the fluid tank before the fluid enters the equipment depending on a fluid pressure; and
controlling the fluid return flow carried back from the supply line from an area located downstream from the by-pass line outlet and from an area located upstream from the by-pass line inlet, according to said second parameter,
wherein the fluid return flow is directed back to the fluid tank through a line separate from the supply line.

16. The process according to claim 15, wherein at least one of the first and second parameters of the fluid is a fluid temperature.

17. The process according to claim 15, wherein the first and second parameters are the same.

18. The process according to claim 15, wherein the step of controlling the respective fluid flows in the main line and in the by-pass line according to said first parameter, and the step of controlling the respective fluid flows carried back from the supply line from an area located downstream from the by-pass line outlet and from an area located upstream from the by-pass line inlet, according to said second parameter, are synchronously carried out.

19. The process according to claim 15, wherein the second parameter is a fluid temperature, preferably in the supply line or in the fluid tank, and wherein the heat exchanger is a cooler, wherein, when it is determined, because of the fluid pressure, that part of the fluid has to be carried back to the fluid tank, and when said fluid temperature is below a first predetermined threshold, the fluid directed back to the fluid tank is carried from the supply line only from an area located upstream from the by-pass line inlet.

20. The process according to claim 15, wherein the second parameter is a fluid temperature, preferably in the supply line or in the fluid tank, and wherein the heat exchanger is a cooler, wherein, when it is determined, because of the fluid pressure, that part of the fluid has to be carried back to the fluid tank, and when said fluid temperature is below a first predetermined threshold, the fluid directed back to the fluid tank is carried from the supply line only from an area located downstream from the by-pass line inlet.

* * * * *